US010104361B2

(12) United States Patent
Budagavi et al.

(10) Patent No.: US 10,104,361 B2
(45) Date of Patent: Oct. 16, 2018

(54) CODING OF 360 DEGREE VIDEOS USING REGION ADAPTIVE SMOOTHING

(71) Applicant: Samsung Electronics Co., Ltd., Suwon-si, Gyeonggi-do (KR)

(72) Inventors: Madhukar Budagavi, Plano, TX (US); Ankur Saxena, Dallas, TX (US); Jeffrey Wilkinson, Flower Mound, TX (US); John Furton, Dallas, TX (US); Andrew Dickerson, Allen, TX (US); Guoxin Jin, Evanston, IL (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 183 days.

(21) Appl. No.: 14/941,436

(22) Filed: Nov. 13, 2015

(65) Prior Publication Data

US 2016/0142697 A1    May 19, 2016

Related U.S. Application Data

(60) Provisional application No. 62/080,104, filed on Nov. 14, 2014, provisional application No. 62/110,053, filed on Jan. 30, 2015.

(51) Int. Cl.
*H04N 19/46*    (2014.01)
*H04N 13/161*   (2018.01)
(Continued)

(52) U.S. Cl.
CPC ......... *H04N 13/161* (2018.05); *H04N 13/004* (2013.01); *H04N 13/0007* (2013.01);
(Continued)

(58) Field of Classification Search
None
See application file for complete search history.

(56) References Cited

U.S. PATENT DOCUMENTS 5,818,964 A    10/1998   Itoh
6,115,078 A *  9/2000   Kino ................... H04N 1/4092
                                                            348/252
(Continued)

FOREIGN PATENT DOCUMENTS

CN    101938605 A    1/2011
CN    103716643 A    4/2014
CN    104012086 A    8/2014

OTHER PUBLICATIONS

Zheng, et al.; "Adaptive Selection of Motion Models for Panoramic Video Coding"; ICME; 2007; pp. 1319-1322.
(Continued)

*Primary Examiner* — Jay Patel
*Assistant Examiner* — Shadan E Haghani

(57) ABSTRACT

A video processing unit and method for region adaptive smoothing. The image processing unit includes a memory and one or more processors. The one or processors are operably connected to the memory and configured to stitch together a plurality of video frames into a plurality of equirectangular mapped frames of a video. The one or processors are configured to define a top region and a bottom region for each of the equirectangular mapped frames of the video; perform a smoothing process on the top region and the bottom region for each of the equirectangular mapped frames of the video; and encode the smoothed equirectangular mapped frames of the video.

20 Claims, 11 Drawing Sheets

(51) Int. Cl.
  H04N 13/156    (2018.01)
  H04N 19/117    (2014.01)
  H04N 19/17     (2014.01)
  H04N 13/00     (2018.01)
  H04N 13/02     (2006.01)
  H04N 19/167    (2014.01)
  H04N 19/86     (2014.01)

(52) U.S. Cl.
  CPC ....... *H04N 13/0242* (2013.01); *H04N 13/156* (2018.05); *H04N 19/117* (2014.11); *H04N 19/167* (2014.11); *H04N 19/17* (2014.11); *H04N 19/46* (2014.11); *H04N 19/86* (2014.11)

(56) References Cited

U.S. PATENT DOCUMENTS

| | | | |
|---|---|---|---|
| 7,825,937 B1 | 11/2010 | Sakhartchouk et al. | |
| 9,317,895 B1* | 4/2016 | Tidwell | G06T 3/005 |
| 2004/0001091 A1 | 1/2004 | Kressin | |
| 2005/0285974 A1 | 12/2005 | Kim | |
| 2012/0027101 A1 | 2/2012 | Tanaka | |
| 2012/0213289 A1* | 8/2012 | Gohshi | H04N 5/208 |
| | | | 375/240.16 |
| 2013/0148907 A1 | 6/2013 | Su et al. | |
| 2013/0156097 A1* | 6/2013 | Budagavi | H04N 19/00066 |
| | | | 375/240.02 |
| 2013/0156332 A1 | 6/2013 | Tian | |
| 2014/0092209 A1 | 4/2014 | Azar et al. | |
| 2014/0132788 A1 | 5/2014 | Ramsay et al. | |
| 2014/0218354 A1 | 8/2014 | Park et al. | |
| 2015/0172669 A1* | 6/2015 | Nishiyama | H04N 19/136 |
| | | | 375/240.08 |
| 2015/0373235 A1* | 12/2015 | Chiang | H04N 5/213 |
| | | | 348/241 |
| 2016/0012855 A1* | 1/2016 | Krishnan | G11B 27/105 |
| | | | 386/241 |
| 2016/0021373 A1* | 1/2016 | Queru | H04N 19/136 |
| | | | 382/239 |

OTHER PUBLICATIONS

Narroschke, et al.; "Extending HEVC by an affine motion model"; IEEE Picture Coding Symposium; Dec. 11, 2013; 15 pages.
International Search Report and Written Opinion issued for PCT/KR2015/012305 dated Mar. 2, 2016, 10 pgs.
Chi-Wing Fu et al., "The Rhombic Dodecahedron Map: An Efficient Scheme for Encoding Panoramic Video", IEEE Transactions on Multimedia, vol. 11., No. 4, Apr. 28, 2009, 12 pgs.
Communication pursuant to Rule 164(1) EPC dated Oct. 16, 2017 in connection with European Patent Application No. 15 85 9270.
Madhukar Budagavi et al., "360 Degrees Video Coding Using Region Adaptive Smoothing", 2015 IEEE International Conference on Image Processing (ICIP), Sep. 27, 2015, pp. 750-754.
www.tawbaware.com, "PTAssembler Projections", Internet citation, Dec. 2008, pp. 1-15.
Yao Xiaohui et al., "A New Environment Mapping Method using Equirectangular Panorama from Unordered Images", 2011 International Conference on Optical Instruments and Technology: Optoelectronic Measurement Technology and Systems, vol. 8201, No. 1, Nov. 1, 2011, pp. 1-9.
Jin et al.; "Motion Estimation and Compensation for Fisheye Warped Video"; 2015 IEEE International Conference on Image Processing (ICIP); Quebec City, QC, Canada; Sep. 27-30, 2015; 5 pages.
F. Neilsen; "Surround video: a multihead camera approach"; The Visual Computer; Issue 21; Feb. 2005; 12 pages.
Pickering et al.; "Enhanced Motion Compensation Using Elastic Image Registration"; 2006 IEEE International Conference on Image Processing; Atlanta, Georgia, USA; Oct. 8-11, 2006; 4 pages.
Tosic et al.; "Multiresolution Motion Estimation for Omnidirectional Images"; 2005 13th European Signal Processing Conference; Antalya, Turkey; Sep. 4-8, 2005; 4 pages.
Foreign Communication from Related Counterpart Application; European Patent Application No. 15859270.9; Extended European Search Report and European Search Opinion dated Feb. 2, 2018; 16 pages.
The First Office Action regarding Chinese Patent Application No. 201580062009.8, dated Jul. 11, 2018, 16 pages.

* cited by examiner

CODING OF 360 DEGREE VIDEOS USING REGION ADAPTIVE SMOOTHING

CROSS-REFERENCE TO RELATED APPLICATION(S) AND CLAIM OF PRIORITY

The present application claims priority to U.S. Provisional Patent Application Ser. No. 62/110,053 filed Jan. 30, 2015, entitled "CODING OF 360 DEGREES VIDEOS USING REGION ADAPTIVE SMOOTHING." The content of the above-identified patent document is incorporated herein by reference. The present application also claims priority to U.S. Provisional Patent Application Ser. No. 62/080,104 filed Nov. 14, 2014, entitled "MOTION ESTIMATING AND COMPENSATION FOR 360 DEGREE VIDEO." The content of the above-identified patent document is incorporated herein by reference.

TECHNICAL FIELD

The present application relates generally to generating video data and, more specifically, to a coding of 360 degrees videos using region adaptive smoothing.

BACKGROUND 360 degrees video is a new way of experiencing immersive video using devices such as GearVR. 360 degrees video enables immersive "real life," "being there" experience for consumers by capturing the 360 degree view of the world. Users can change their viewpoint and dynamically view any part of the captured scene they desire. 360 degrees videos require higher bitrates than conventional videos due to increased video resolution (4K and beyond) needed to support the wider field of view. Bitrate increase is a limiting factor in providing high quality 360 degrees immersive video viewing experience to consumers.

Hence, the bitrate requirements are also higher necessitating the need for efficient compression. 360 degrees video has unique characteristics that can be exploited to improve compression efficiency. Due to the warping present in the video, the motion in the video is frequently non-translational.

SUMMARY

Embodiments of the present disclosure provide, coding of 360 degree videos using region adaptive smoothing and motion estimating and compensation for 360 degree video.

In one embodiment, a video processing unit capable of region adaptive smoothing is provided. The image processing unit includes a memory and one or more processors. The one or more processors are operably connected to the memory and configured to stitch together a plurality of video frames into a plurality of equirectangular mapped frames of a video. The one or more processors are configured to define a top region and a bottom region for each of the equirectangular mapped frames of the video; perform a smoothing process on the top region and the bottom region for each of the equirectangular mapped frames of the video; and encode the smoothed equirectangular mapped frames of the video.

In another embodiment, a video processing unit capable of region adaptive smoothing is provided. The image processing unit includes a receiver and one or more processors. The receiver is configured to receive metadata and a smoothed equirectangular mapped frames of a video. The one or more processors configured to decode the smoothed equirectangular mapped frames of the video smoothed across smoothed regions along an outside border of the smoothed equirectangular mapped frames of a video; perform an enhancement technique on the smoothed region and render each of the equirectangular mapped frames of the video into a spherical shape.

In yet another embodiment, a method for region adaptive smoothing is provided. The method includes stitching a plurality of video frames into equirectangular mapped frames of a video, respectively; defining a top region and a bottom region for each of the equirectangular mapped frames of the video; performing a smoothing process on the top region and the bottom region for each of the equirectangular mapped frames of the video; and encoding the smoothed equirectangular mapped frames of the video.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
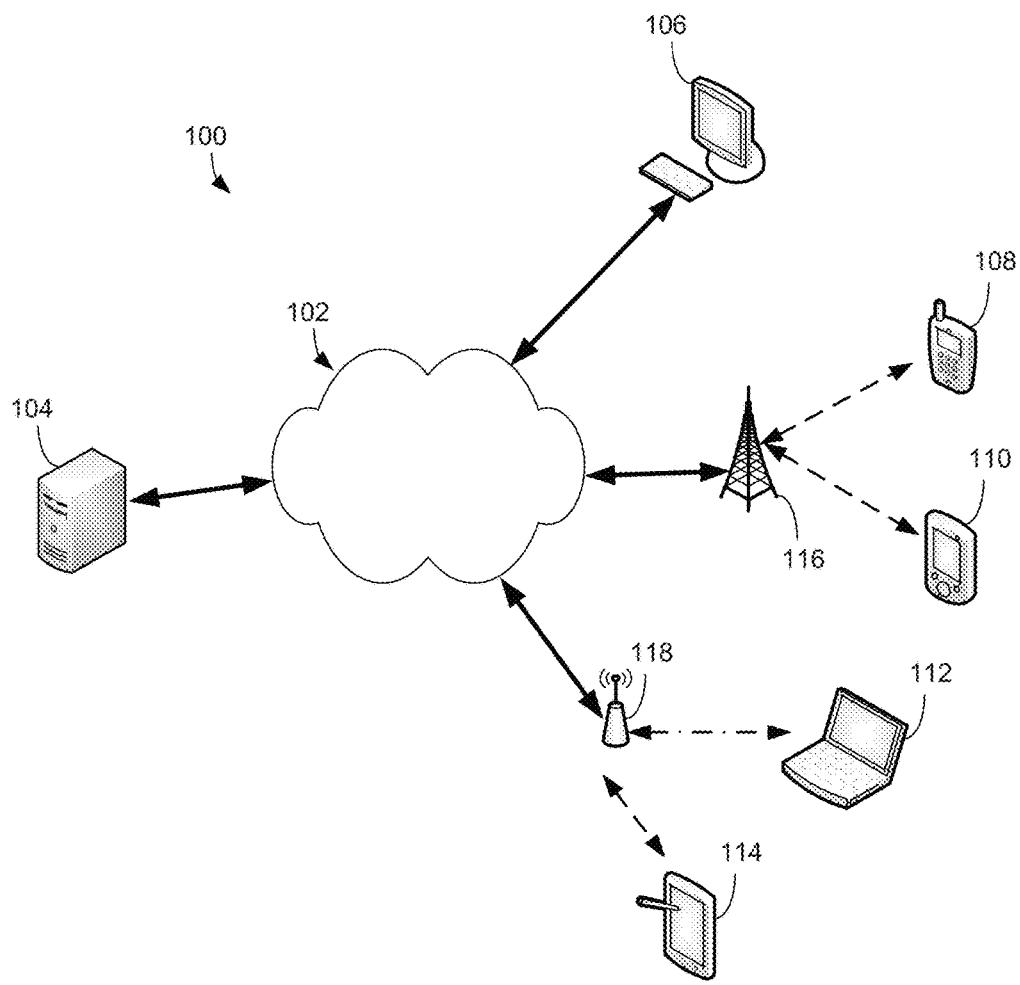
FIG. 1 illustrates an example computing system according to various embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

The following documents and standards descriptions are hereby incorporated into the present disclosure as if fully set forth herein:

[1] M. Narroschke and R. Swoboda, "Extending HEVC by an affine motion model, pp. 321-324, IEEE Picture Coding Symposium, 2013.

[2] J. Zheng et. al., "Adaptive selection of motion models for panoramic video," pp. 1319-1322, IEEE International Conference on Multimedia and Expo, 2007.

Prior work that uses sophisticated motion models to code the video, such as [1] and [2], can be used. However, a disadvantage of these techniques is that they need modifications to video decoding architecture and hence cannot be supported on existing devices.

360 degrees video is created by warping and stitching images from multiple cameras that cover the 360 degrees world. The stitched image is then equirectangularly mapped into a two-dimensional (2D) rectangular image that is then coded using standard video codecs such as H.264/AVC and HEVC/H.265. During playback the compressed video can be streamed or downloaded and decoded. After decoding, the video is texture mapped onto a virtual sphere in a 3D graphics environment with the viewer located at the center of the virtual sphere. The viewer can navigate inside the virtual sphere to see the view of the 360 degrees world he/she desires and thereby experiencing an immersive experience. A characteristic of the equirectangular mapping is that the top and the bottom views occupy a larger number of pixels in the 2D stitched image when compared to the actual area on the virtual sphere. This disclosure exploits this characteristic of the equirectangular mapping to provide bitrate savings. This disclosure smooths the top and the bottom regions of video before encoding. Since the pixels in the top and the bottom part of the stitched picture have more resolution than what is perceptually noticeable, the smoothing does not lead to perceptual quality degradation. However, it results in bitrate saving since smooth regions require less transform coefficients to be transmitted. The smoothing in this disclosure can be fixed or varied depending on the regions of the 2D image. The methods of this disclosure can achieve savings of up to 20%. The smoothing is a pre-processing step at the encoding side and not dependent on the type of the codec; hence it can be easily supported using existing codecs.

This disclosure also deals with new types of video sequences, i.e., 360 degree video sequences, for which multiple views of a panoramic scene are warped and stitched. 360 degree video sequences have many applications in virtual reality (VR) devices. In order to transmit the 360 video sequences efficiently, the multi-view sequences are not transmitted individually. Instead, the warped and stitched version consisting of rectangular frames is stored. The state-of-the-art video coding techniques, such as HEVC and H.264/AVC, cannot fully utilize the characteristics of the warped image space. Particularly, in regular video sequences, motion estimation provides substantial compression gains in a video codec. However, in the warped space, the object to be motion estimated, e.g., a block of pixels will be deformed. Thus, the motion estimation technique should be re-designed to comply with the warped space.

In the High Efficiency Video Coding (HEVC) standard, there are three modes in the Inter Prediction process. In the skip mode, the transform coefficients are not transmitted and the coding unit (CU) is represented as a prediction unit (PU) and the parameters are obtained by merge mode. In the merge mode, the current PU parameters are inferred from neighboring PU's. And normal inter prediction mode, where the motion parameters are computed and signaled.

In the Motion Vector Prediction, the spatial and temporal neighboring PU motion vectors are used to predict current PU motion vector.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

In this illustrative embodiment, computing system 100 provides coding of 360 degree videos using region adaptive smoothing and motion estimating and compensation for 360 degree video, as will be discussed in greater detail below. For example, server 104 may provide for encoding of 360 degree videos using region adaptive smoothing and motion estimating and compensation for 360 degree video. Similarly, client devices 108-114 may receive encoded images or videos from server 104 over network 102 and decode the 360 degree videos using region adaptive smoothing and motion estimating and compensation for 360 degree video.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
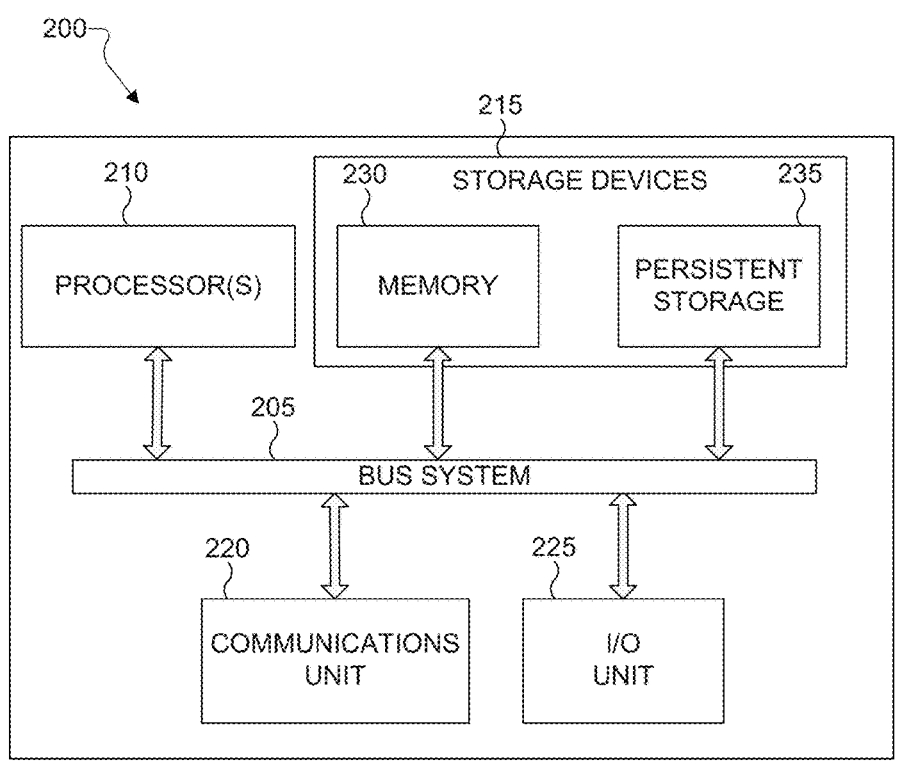
FIGS. 2 and 3 illustrate example devices in a computing system according to various embodiments of the present disclosure.
Figure 3:
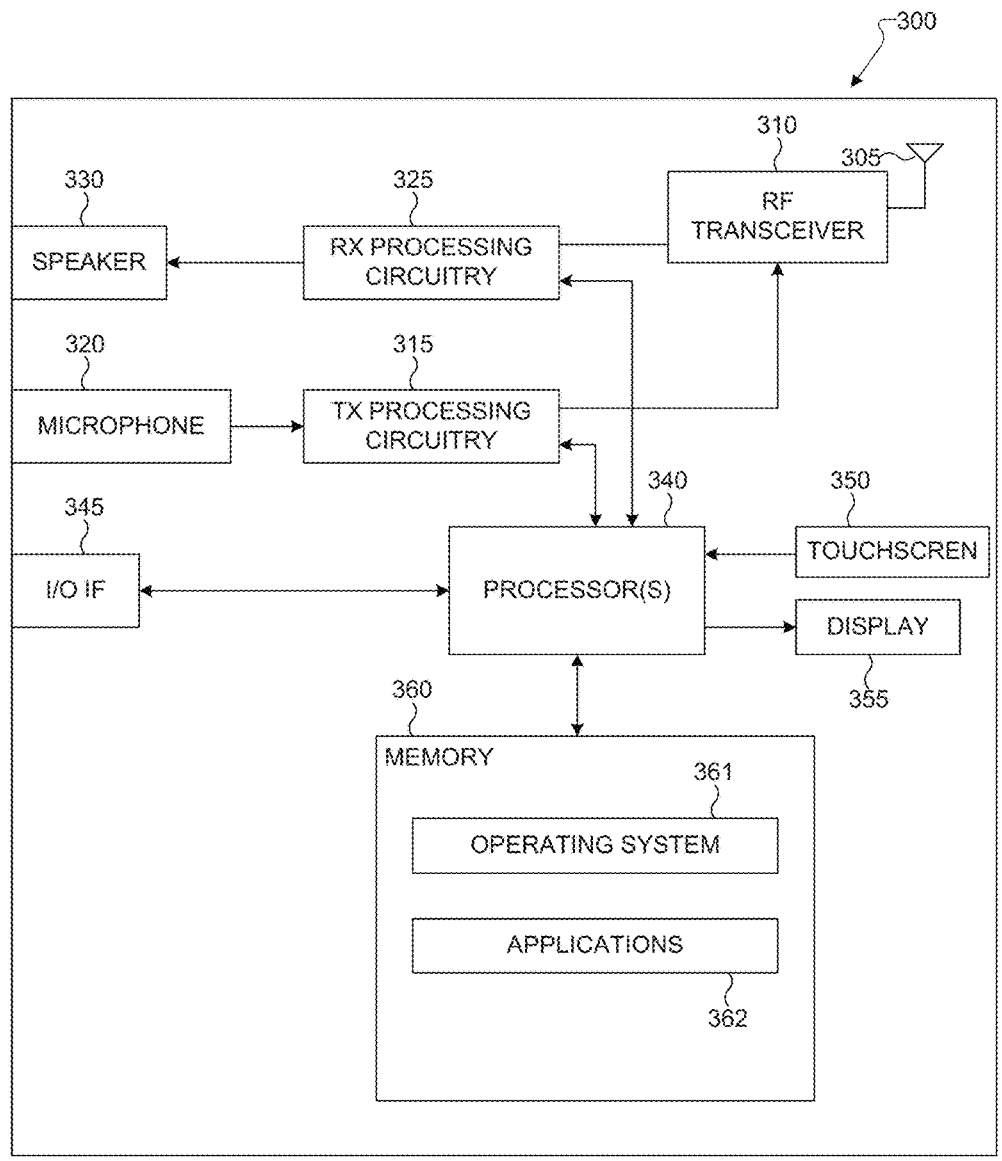

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between one or more processors 210, at least one storage device 215, at least one communications unit 220, and at least one input/output (I/O) unit 225.

The processor(s) 210 execute instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to perform operations for unlocking an electronic device with an authenticated wearable device.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, server 200 may implement an image processing unit that provides coding of 360 degree videos using region adaptive smoothing and motion estimating and compensation for 360 degree video, as will be discussed in greater detail below. Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360, such as operations for unlocking an electronic device with an authenticated wearable device. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display unit 355. The operator of the client device 300 can use the touchscreen 350 to enter data into the client device 300. The display 355 may be a liquid crystal display or other display capable of rendering text and/or at least limited graphics, such as from web sites.

The memory 360 is coupled to the processor(s) 340. Part of the memory 360 could include a random access memory (RAM), and another part of the memory 360 could include a Flash memory or other read-only memory (ROM).

As will be discussed in greater detail below, in this illustrative embodiment, client device 300 implement an image processing unit that receives encoded images or videos from server 104 over network 102 and decodes the 360 degree videos using region adaptive smoothing and motion estimating and compensation for 360 degree video. Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
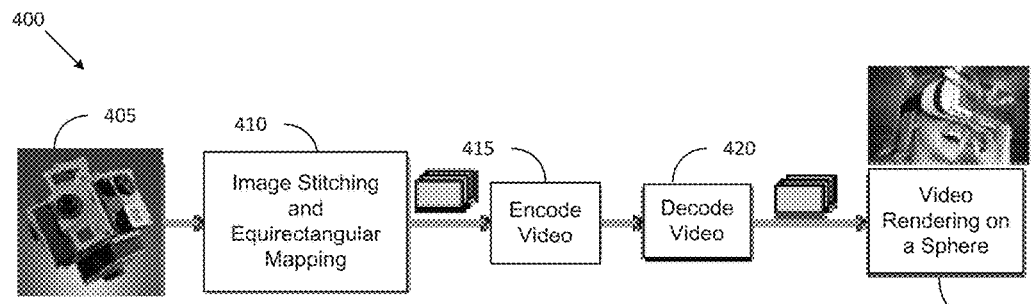
FIG. 4 illustrates a 360 degrees video processing chain according to various embodiments of the present disclosure.

FIG. 4 illustrates a 360 degrees video processing chain 400 from capture 405, to image stitching and equirectangular mapping 410, to video encoding 415, to video decoding 420, and rendering 425. The 360 degree view of the world is typically captured using multiple cameras. The capture 405 of FIG. 4 shows an example where seven cameras are used. Five cameras covering the front, the back and the sides, one camera on the top and one camera on the bottom. Images from the multiple cameras are aligned, stitched together, and equirectangularly mapped 410 into a single image.

Figure 5A:
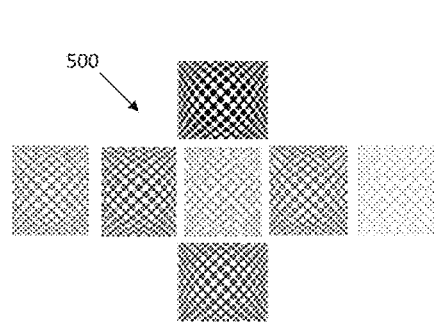
FIGS. 5A, 5B, 5C, and 5D illustrate an example of stitching and equirectangular mapping according to various embodiments of the present disclosure.
Figure 5B:
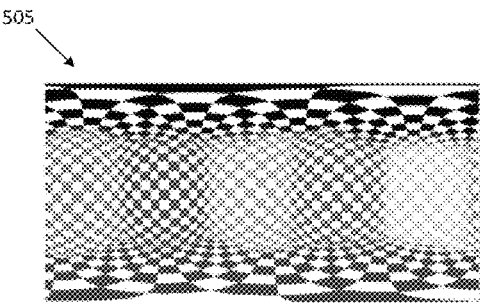

FIGS. 5A-5D illustrate an example of stitching and equirectangular mapping 510. FIG. 5A illustrates the seven images 500 from the seven cameras that are fed to the stitching process. These inputs are generated by simulating the capture of checkerboard images using a wide eye lens with horizontal field of view of 122.6 degrees and vertical field of view of 94.4 degrees. FIG. 5B illustrates the corresponding stitched image 505. The top and bottom checkerboard patterns are from the top and bottom cameras respectively. Each of the seven images in FIG. 5A are of size 1920×1440. The stitched image 505 in FIG. 5B is of size 4096×2048.

Figure 5C:
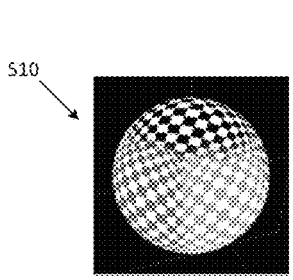
Figure 5D:
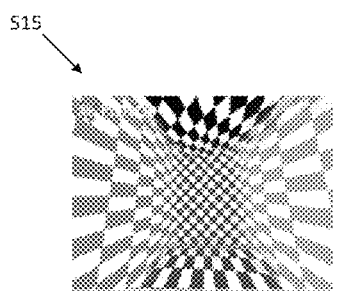

The 360 degrees video at the output of the stitching process is coded as regular 2D video by using standard video codecs such as H.264/AVC and HEVC/H.265. During playback the compressed video can be streamed or downloaded and decoded. After decoding, the video is texture mapped onto a virtual sphere 510 in a 3D graphics environment, as illustrated in FIG. 5C, with the viewer located at the center of the virtual sphere 510. When the video in FIG. 5B is viewed with a 360 degrees video viewer, the user gets a perception of standing in a room with five walls and a ceiling and a floor. FIG. 5D is a screen capture of the output 515 of a 360 degrees video viewer that has been included in the figure to help understand this perception.

Another observation is the top and the bottom views occupy a larger number of pixels in the 360 degrees stitched image when compared to the front, the back and the side views. This is evident comparing FIG. 5B to FIG. 5C, where all the views cover roughly equal areas on the sphere. This observation is a characteristic of the equirectangular mapping and also exists in world maps that are mappings of the surface of the globe (a sphere) to a 2D surface (the map). In world maps, the land masses near the poles appear much larger than the land masses near the equator. This disclosure exploits this characteristic of the equirectangular mapping to provide bitrate savings, smoothing the top and the bottom regions of video before encoding. Since the pixels in the top and the bottom part of the stitched picture have more resolution than what is perceptually noticeable, the smoothing does not lead to perceptual quality degradation. However, the smoothing results in bitrate savings since smooth regions require transmitting fewer transform coefficients.

Figure 6:
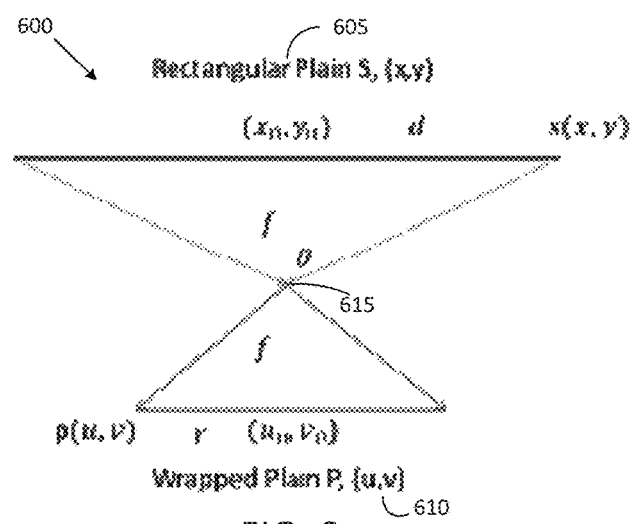
FIG. 6 illustrates an equidistant mapping between a rectangular plain and a warped plain according to various embodiments of the present disclosure.

FIG. 6 illustrates an equidistant mapping 600 between a rectangular plain 605 and a warped plain 610. The rectangular plain 605 is in terms of x and y. The warped plain 610 is in terms of u and v.

The warpings in a fisheye lens are non-linear mappings from the rectangular plane to the warped plane 610. There are varieties of models representing the mapping, and among those, the equidistant mapping is most common.

$$r = f\theta, \quad \text{(eq. 1)}$$

whereas demonstrated in FIG. 1, $\theta$ is the angle of a point $s(x,y)$ in the rectangular plane 605 to the plane center 615, $(x_0, y_0)$. The mapping result r is the distance between the mapped point $p(u,v)$ in the warped plane P to the warped plane center 615, $(u_0, v_0)$.

The mapping process is described as the following. Let d be the distance between s to $(x_0, y_0)$: $d = \sqrt{((x-x_0)^2 + (y-y_0)^2)}$. The angle will be $\theta = \arctan(d/f)$. The warped distance is then $r = f \arctan(d/f)$. Given the Homogeneous relationship between (x,y) in S to (u,v) in P:

$$\frac{u}{r} = \frac{x}{d}, \frac{v}{r} = \frac{y}{d} \qquad \text{(eq. 2)}$$

The mapping is written as $$u = \frac{xf}{d}\arctan\left(\frac{d}{f}\right) \qquad \text{(eq. 3)}$$

and $$v = \frac{yf}{d}\arctan\left(\frac{d}{f}\right) \qquad \text{(eq. 4)}$$

The inverse mapping from warped plane 615, P, to rectangular plane 610, S, can be derived similarly (x,y)=iT (u,v):

$$\theta = \frac{r}{f} \qquad \text{(eq. 5)}$$

$$d = f\tan(\theta) = f\tan\left(\frac{r}{f}\right) \qquad \text{(eq. 6)}$$

$$x = \frac{uf}{r}\tan\left(\frac{r}{f}\right) \qquad \text{(eq. 7)}$$

and $$y = \frac{vf}{r}\tan\left(\frac{r}{f}\right) \qquad \text{(eq. 8)}$$

Figure 7A:
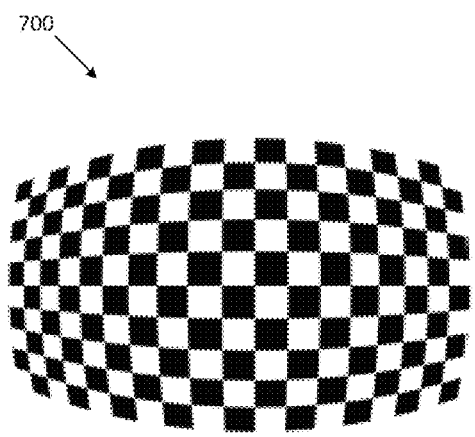
FIG. 7A illustrates the effects of warping after mapping according to various embodiments of the present disclosure.
Figure 7B:
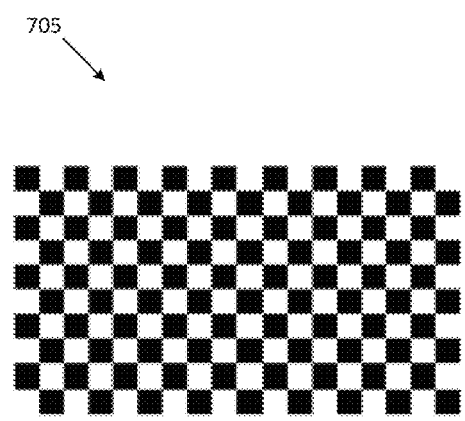
FIG. 7B illustrates the effects of warping before mapping according to various embodiments of the present disclosure.

FIG. 7A illustrates the effects 700 of warping after mapping and FIG. 7B illustrates the effects 705 of warping before mapping. The characteristic of the mapping is more warping is applied the further the point is from the center.

Figure 8A:
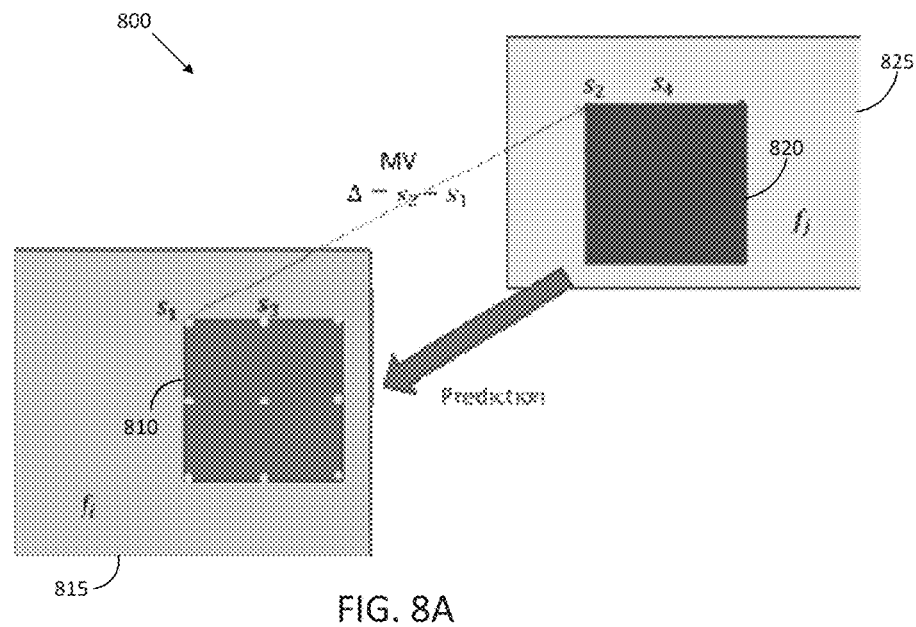
FIG. 8A illustrates a motion estimation according to various embodiments of the present disclosure.

FIG. 8A illustrates a motion estimation 800, where a PU 810 in current frame 815 $f_i$ is looking for a prediction candidate block 820 from previously coded and reconstructed frame 825 $f_j$ that has the same shape as current PU 810. The reference frame index j and the motion vector Δ will be encoded as motion estimation parameters.

Figure 8B:
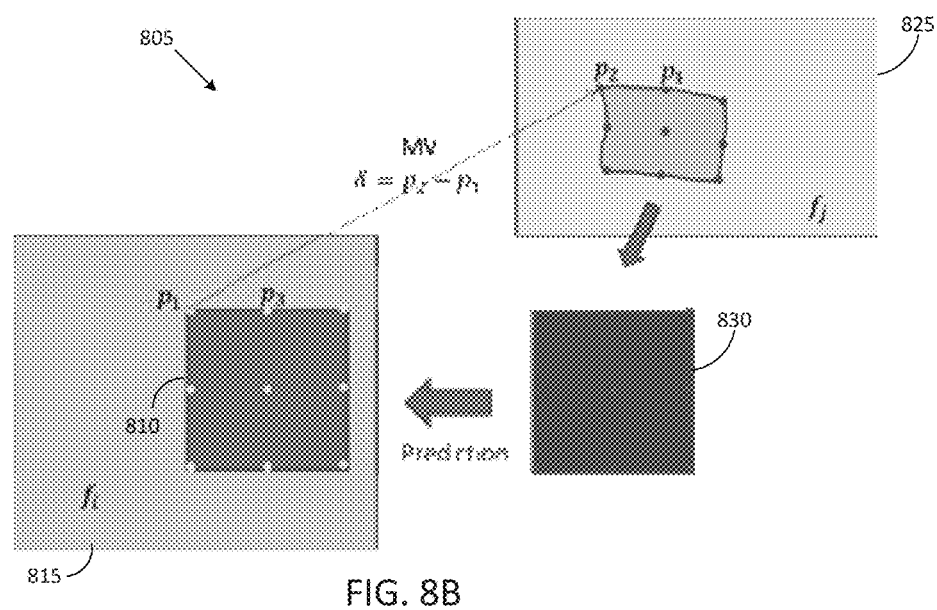
FIG. 8B illustrates a warped motion estimation according to various embodiments of the present disclosure.

FIG. 8B illustrates a warped motion estimation 805. In the rectangular space, the pixel $p_1$ moves to the location of $p_2$, then all the other pixels in the PU will move with the same MV, namely:

$$\Delta = s_2 - s_1 = s_4 - s_3 \qquad \text{(eq. 9)}$$

However, the same motion relationship will not be maintained in the warped plane. If a rectangular block in the warped plane moved with motion vector δ that is not equal to zero, the locations of the pixels within the rectangular block will no longer maintain same relative position to the others. As demonstrated in FIG. 8B, if $p_1$ moves to the location of $p_2$, then the location where $p_3$ moves to will not be $p_3+p_2-p_1$. However, the same motion relationship should be maintained in the unwarped plane. As a result, intermediate mappings and interpolation should be done.

The warped motion estimation problem is: Given a PU in the frame $f_i$ which is indicated by the top-left pixel $p_1$ in the warped video sequence, if $p_1$ moves to the location of $p_2$ in the other frame $f_j$, what will another pixel $p_3$ in the PU move to (i.e. what is the location of $p_4$)?

By assuming the same motion relationship in the unwarped plane, intermediate mappings 830 are used to compute the location of $p_4$ in the rectangular plane and map it back to the warped plane. The mapping from rectangular plane S to warped plane P is denoted by p=T(s), and the inverse mapping is denoted by s=iT(p)

$$s_1 = iT(p_1), s_2 = iT(p_2), s_3 = iT(p_3) \qquad \text{(eq. 10)}$$

$$\Delta = s_2 - s_1 \qquad \text{(eq. 11)}$$

$$s_4 = s_3 + \Delta \qquad \text{(eq. 12)}$$

$$p_4 = T(s_4) = T(s_3 + \Delta) = T(iT(p_3) + iT(p_1 + \delta) - iT(p_1)) \qquad \text{(eq. 13)}$$

Figure 9A:
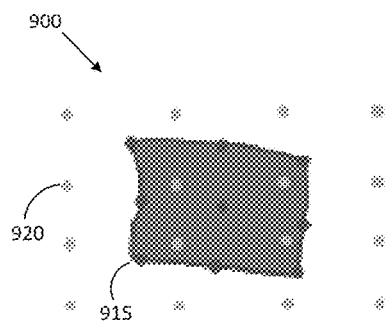
FIG. 9A illustrates an interpolation 900 of mapped pixels 915 by pixels 920 in frame $f_j$ according to various embodiments of the present disclosure.

FIG. 9A illustrates an interpolation 900 of mapped pixels 915 by pixels 920 in frame $f_j$ 925. Once all the pixel locations after motion are obtained using the intermediate mappings, the values of the pixels at those locations should be determined by interpolation techniques.

Figure 9B:
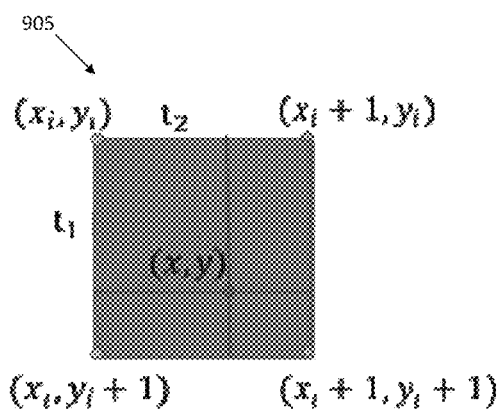
FIG. 9B illustrates interpolation techniques according to various embodiments of the present disclosure.

A possible embodiment in this invention uses bilinear interpolation for the Luma components and nearest neighbor interpolation of the chroma components. The prototype experiments shows that using bilinear interpolation in Luma components is much advance than using nearest neighbor interpolation. Referring to FIG. 9B, the two interpolation techniques are described as following:

A pixel location (x,y) found by intermediate mappings must resides in a cell between 4 neighboring pixels on the pixel grid. Let $x_i = \lfloor x \rfloor$ and $y_i = \lfloor y \rfloor$ be the integer part of (x,y) respectively. $t_2 = x - x_i$ and $t_1 = y - y_i$ are the coordinate differences. The nearest neighbor interpolation finds the value of (x,y) by I(x,y)=I(nearest points on the grid to x,y), whereas the bilinear interpolation finds the value of (x,y) by $$I(x,y) = (1-t_1)I(x,y_i) + t_1 I(x,y_i+1) \qquad \text{(eq. 14)}$$

$$I(x,y_i) = (1-t_2)I(x_i,y_i) + t_2 I(x_i+1,y_i) \qquad \text{(eq. 15)}$$

$$I(x,y_i+1) = (1-t_2)I(x_i,y_i+1) + t_2 I(x_i+1,y_i+1) \qquad \text{(eq. 16)}$$

After interpolation, the interpolated pixel values are the prediction of current PU.

Figure 9C:
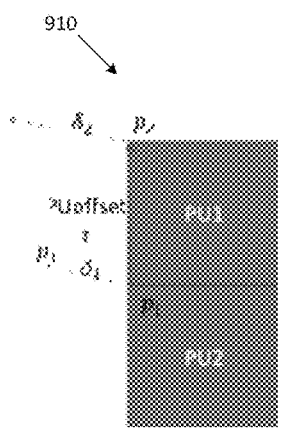
FIG. 9C illustrates a motion vector predictor compensation (MVPC) according to various embodiments of the present disclosure.

FIG. 9C illustrates a motion vector predictor compensation (MVPC) 910 according to various embodiments of the present disclosure. In the inter prediction techniques, motion vector prediction that reuses and encodes the difference between current PU motion vector to one of the neighboring PU's motion vector have great advantage for utilizing spatial coherence. However, in the warped plane, because of the difference of PU locations, the neighboring PU's motion vector should not be used directly, instead compensation is added.

As illustrated in FIG. 9C, the MVPC requires the current $PU_2$ knows the offset τ of reference $PU_1$ as well as the motion vector $\delta_2$ of $PU_1$. Then the motion vector prediction is $\delta_2$ plus MVPC γ, where same motion relationship in unwarped plane is revisited.

$$s_1 = iT(p_1), s_2 = iT(p_2) \qquad \text{(eq. 17)}$$

$$p_2 = p_1 + \tau \qquad \text{(eq. 18)}$$

$$p_4 = p_2 + \delta_2, \delta_2 = p_4 - p_2 \qquad \text{(eq. 19)}$$

$$\Delta_2 = S_4 - S_2 = iT(p_4) - iT(p_2) \qquad \text{(eq. 20)}$$

$$s_3 = s_1 + \Delta_2 = S_1 + iT(p_2 + \delta_2) - iT(p_2) \qquad \text{(eq. 21)}$$

$$\delta_1 = p_3 - p_1 = T(iT(p_1) + iT(p_2 + \delta_2) - iT(p_2)) - p_1 \qquad \text{(eq. 22)}$$

$$\begin{aligned}\gamma &= \delta_1 - \delta_2 \\ &= T(iT(p_1) + iT(p_2 + \delta_2) - iT(p_2)) - p_1 - p_4 + p_2 \\ &= T(iT(p_1) + iT(p_1 + \tau + \delta_2) - iT(p_1 + \tau)) - p_1 - \delta_2\end{aligned} \qquad \text{(eq. 23)}$$

Figure 10:
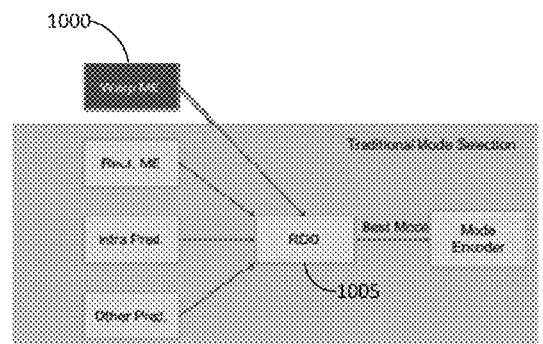
FIG. 10 illustrates an additional warp mode in RDO search according to various embodiments of the present disclosure.

FIG. 10 illustrates an additional warp mode 1000 in an RDO search 1005 according to various embodiments of the present disclosure. In certain embodiments, warp motion estimation mode (including the MVPC) is added upon traditional inter prediction techniques.

In this case, additional overhead must encoded to indicate the extra warp mode. Two coding schemes are shown in Table 1.

TABLE 1

Overhead Coding

| Scheme 1 | Scheme 2 |
|---|---|

Encoder

```
...                                    ...
encode skipFlag                        encode skipFlag
if ( skipFlag)                         if ( skipFlag)
    encode warpFlag                        encode warpFlag
    encode mergeIndex                      encode MergeIndex
else                                   else
    if ( mode = MODE_INTRA)                if ( mode = MODE_INTER)
        encode 0                               encode 0
    else if (mode = MODE_INTER)            else if (mode = MODE_INTRA)
        encode 1                               encode 1
        encode 0 for no warp                   encode 0
    else // the case of MODE_INTER_WARP    else // the case of MODE_INTER_WARP
        encode 1                               encode 1
        encode 1 for warp                      encode 1
    endif                                  endif
    encoder inter pred parameters          encoder inter pred parameters
endif                                  endif
....                                   ....
```

Decoder

```
...                                    ...
decode skipFlag                        decode skipFlag
if (skipFlag)                          if (skipFlag)
    decode warpFlag                        decode warpFlag
    if (warpFlag)                          if (warpFlag)
        setPredMode(MODE_INTER_WARP)           setPredMode(MODE_INTER_WARP)
    else                                   else
        setPredMode(MODE_INTER)                setPredMode(MODE_INTER)
    endif                                  endif
    decode mergeIndex                      decode mergeIndex
else                                   else
    decode flag                            decode flag
    if (flag)                              if (flag)
        decode warpFlag                        decode warpFlag
        if (warpFlag)                          if (warpFlag)
            setPredMode(MODE_INTER_WARP)           setPredMode(MODE_INTER_WARP)
        else                                   else
            setPredMode(MODE_INTER)                setPredMode(MODE_INTRA)
        endif                                  endif
    else                                   else
        setPredMode(MODE_INTRA)                setPredMode(MODE_INTER)
    endif                                  endif
endif                                  endif
...                                    ...
```

Look-up tables are used to reduce the computation table. Two aspects that significantly affect the complexity of the warping are mapping functions and distance computation. The distance between the plain center to the pixels on the grid may not change for all the frames, so the distances are pre-computed and stored to a 2D array that is the same size as the video frame.

In the mapping function, the most expensive calculation is finding the value of tan( ) and arctan( ). In certain embodiments, the values are quantized and stored with limited precision. For example, the distance between two adjacent pixels is one (normalized). Then the smallest non-zero difference between two distance is:

$$\lambda = \frac{\sqrt{2}-1}{4f}, \quad \text{(eq. 24)}$$

where √2 is the distance of diagonal pixels, 1 is the distance of adjacent pixels, f is the focal length in unit of pixels and 4 represent the smallest fractional ¼ in the motion estimation. The quantized values for forward mapping are:

$$\tan(x), \text{ where } x = 0, \lambda, 2\lambda, \ldots, \frac{\pi}{2} \quad \text{(eq. 25)}$$

and the values of inverse mapping are:

$$\arctan(x), \text{ where } x=0, \lambda, 2\lambda, \ldots, \pi \quad \text{(eq. 26)}$$

TABLE 2

BD Rate comparison in low delay P configuration between HM14 (with fractional motion estimation disabled) to warped motion estimation as an extra mode (proposed). Negative values mean gain. The first 7 rows are natural sequences which are downsampled and warped before coding. The last 3 rows are simulated global motion (with motion speed n pix/frame) and warped.

| Seq. Name | BD Rate | Ave |
|---|---|---|
| BasketballDrillText_wrap_640x360_50 | −3.8% | −1.4% |
| BQTerrace_wrap_640x360_60 | −1.5% | |
| Cactus_wrap_640x360_50 | −0.4% | |
| ParkScene_wrap_640x360_24 | −0.9% | |
| Kimono_wrap_64x360_24 | −0.7% | |
| City_wrap_512x256_60 | −1.9% | |

TABLE 2-continued

BD Rate comparison in low delay P configuration between HM14 (with fractional motion estimation disabled) to warped motion estimation as an extra mode (proposed). Negative values mean gain. The first 7 rows are natural sequences which are downsampled and warped before coding. The last 3 rows are simulated global motion (with motion speed n pix/frame) and warped.

| Seq. Name | BD Rate | Ave |
|---|---|---|
| Crew__wrap__512x256__60 | −0.6% | |
| bask1__wrap__640x360__24 (8 pix/frame) | −8.2% | −9.3% |
| bask2__wrap__640x360__24 (16 pix/frame) | −14.1% | |
| bask3__wrap__640x360__24 (4 pix/frame) | −5.6% | |

Figure 11:
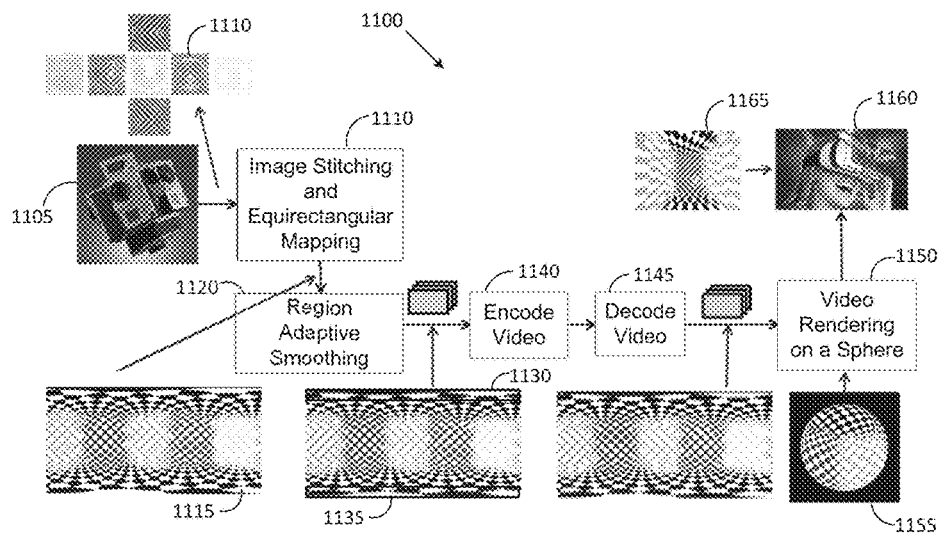
FIG. 11 illustrates the 360 degrees video processing process with such a region adaptive smoothing according to various embodiments of the present disclosure.

FIG. 11 illustrates the 360 degrees video processing process 1100 with such a region adaptive smoothing 1115 according to various embodiments of the present disclosure.

The capture 1105 takes the images from seven different cameras. The images 1110 from the seven cameras are ordered in a 2D pattern. The image stitching and equirectangular mapping 1110 takes the images and combines them into an equirectangular map 1120.

The region adaptive smoothing 1125 is a pre-processing step at the encoding side and not dependent on the type of the codec, hence it can be easily supported using existing codecs.

To test the impact of smoothing, a 7×7 Gaussian filter (with variance of 5) was used to smooth eleven different 360 degrees videos listed in Table 3. The top and bottom pSmooth, the percentage of the top region 1130 and bottom region 1135 of the image that are smoothed, percent of all the images in the video sequences was smoothed and encoded using a x264 (random access setting with QP=27) to determine the bitrate savings. The bitstreams corresponding to Subway, Zoo, and DragonRide2, with and without smoothing, were also formally viewed using a GEARVR to determine the pSmooth value at which the perceptual quality degradations start becoming visible. Subway and Zoo sequences are natural sequences whereas DragonRide2 is a computer generated animation. For natural video sequences, the perceptual quality degradation starts becoming slightly noticeable at pSmooth equal to twenty percent, while for computer generated animation the perceptual quality degradation starts becoming slightly noticeable at pSmooth equal to fifteen percent. This observation roughly holds for other video sequences that were informally viewed. Table 3 below shows the bitrate saving for pSmooth equal to twenty percent and fifteen percent. It can be seen that bitrate savings in the range of four to twenty two percent is achieved with the present region adaptive smoothing technique.

TABLE 1

| | pSmooth = 20% | pSmooth = 15% |
|---|---|---|
| Natural video: | | |
| AirPlane__4096x2048__30fps__P420 | 18.8% | 13.4% |
| BikeRide__4096x2048__30fps__P420 | 8.3% | 3.2% |
| Bridge__4096x2048__30fps__P420 | 8.8% | 5.4% |
| Canal__4096x2048__30fps__P420 | 4.0% | 2.4% |
| DART__4096x2048__30fps__P420 | 15.2% | 7.8% |
| MonoTrain__4096x2048__30fps__P420 | 5.5% | 3.3% |
| Plaza__4096x2048__30fps__P420 | 16.5% | 11.1% |
| Subway__4096x2048__30fps__P420 | 20.5% | 13.5% |
| Zoo__4096x2048__30fps__P420 | 22.7% | 13.2% |
| Computer animation: | | |
| DragonRide1__1920x1080__30fps__P420 | 16.3% | 10.7% |
| DragonRide2__1920x1080__30fps__P420 | 21.7% | 14.6% |
| Average | 14.4% | 9.0% |

Once the equirectangular mapped image 1115 is smoothed, the equirectangular mapped image 1115 is encoded 1140 for transmission. The equirectangular mapped image 1115 is received by a decoder and decoded 1145. Once the equirectangular mapped image 1115 is decoded, an image processing unit renders 1150 the equirectangular mapped image 1115 into a sphere 1155. The sphere 1155 is then used by the viewer 1160 to see the 3D image or video 1165.

Figure 12A:
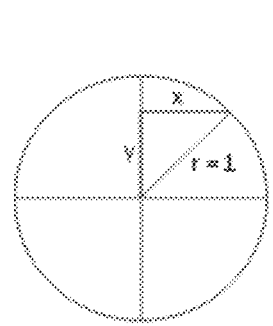
FIG. 12A illustrates the normalized sphere with a radius of one that is used to derive the heuristics for calculating the variance of a Gaussian smoothing filter as a function of the image row number y according to various embodiments of the present disclosure.

Another observation from FIG. 5B is the image is stretched more toward the top and the bottom of the image, allowing an increase the degree of smoothing at the top and the bottom of the image without increasing perceptual loss. The degree of smoothing is controlled by increasing the variance of the Gaussian smoothing filter near the top and the bottom of the image. FIG. 12A illustrates the normalized sphere with a radius of one that is used to derive the heuristics for calculating the variance of a Gaussian smoothing filter as a function of the image row number y. At the image row number y, the inherent resolution of the image on the sphere is proportional to x, i.e. $\sqrt{1-y^2}$. As y increases to the top pole, x keeps decreasing (similarly as y decreases to the bottom pole, x keeps decreasing). However, the equirectangular mapping still uses the full width of the image to represent this resolution. Hence, the following equation that is inversely proportional to $\sqrt{1-y^2}$ is used to determine the variance $\sigma^2$ of Gaussian smoothing filter $$\sigma 2 = K - \frac{K}{\sqrt{1-y^2}} \qquad (eq.\ 1)$$

Figure 12B:
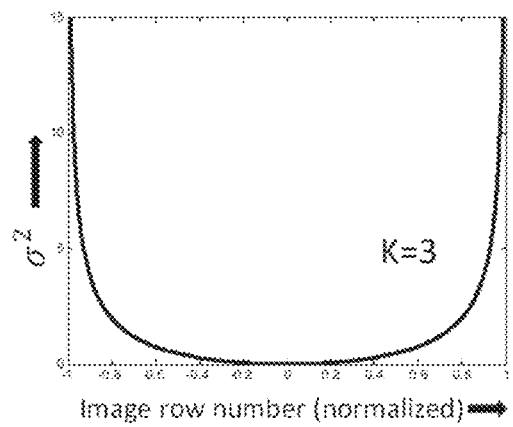
FIG. 12B illustrates how $\sigma^2$ varies with the normalized image row number (normalized to be between negative one, which is bottom of the image, to positive one, which is the top of the image) for K equal to three according to various embodiments of the present disclosure.

As y goes from zero, the center of the image, to one, the top of the image, $\sigma^2$ goes from zero to a large value, i.e., no smoothing to very strong smoothing. FIG. 12B illustrates how $\sigma^2$ varies with the normalized image row number (normalized to be between negative one, which is bottom of the image, to positive one, which is the top of the image) for K equal to three. Variable smoothing was implemented in x264. Table 4 shows the corresponding bitrate savings which are higher than those of Table 3. By increasing K, we found variable smoothing especially useful at low bitrates, with rate control enabled, since the center region of the image is slightly smoothed to achieve additional bitrate savings.

TABLE 2

| | Variable smoothing (K = 3) |
|---|---|
| Natural video: | |
| AirPlane__4096x2048__30fps__P420 | 26.0% |
| BikeRide__4096x2048__30fps__P420 | 18.3% |
| Bridge__4096x2048__30fps__P420 | 13.8% |

TABLE 2-continued

|  | Variable smoothing (K = 3) |
| --- | --- |
| Canal_4096x2048_30fps_P420 | 9.3% |
| DART_4096x2048_30fps_P420 | 25.9% |
| MonoTrain_4096x2048_30fps_P420 | 16.9% |
| Plaza_4096x2048_30fps_P420 | 26.9% |
| Subway_4096x2048_30fps_P420 | 28.6% |
| Zoo_4096x2048_30fps_P420 | 35.3% |
| Computer animation: | |
| DragonRide1_1920x1080_30fps_P420 | 23.2% |
| DragonRide2_1920x1080_30fps_P420 | 27.9% |
| Average | 22.9% |

Figure 13:
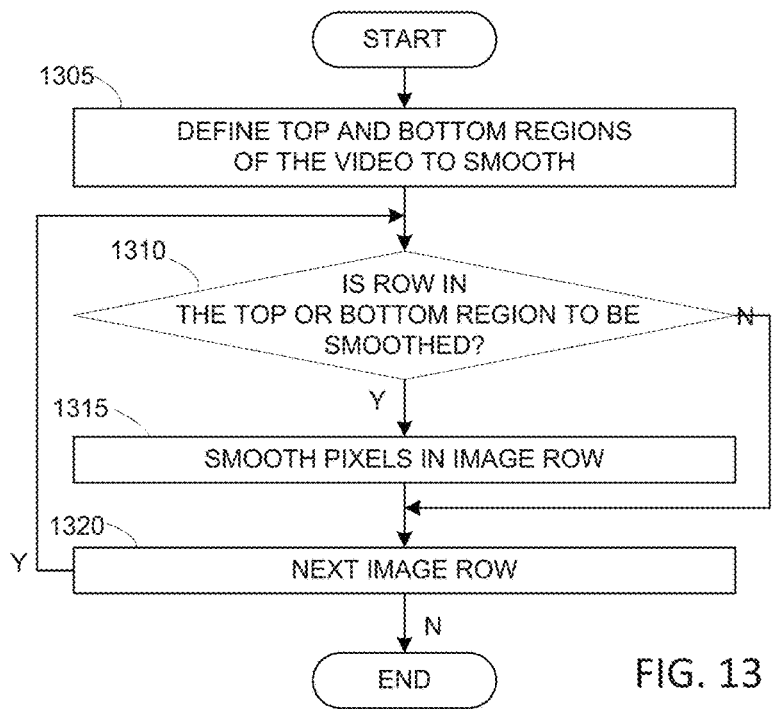
FIG. 13 illustrates a process for coding of 360 degrees videos using region adaptive smoothing according to various embodiments of the present disclosure.

FIG. 13 illustrates a process for coding of 360 degrees videos using region adaptive smoothing according to various embodiments of the present disclosure. For example, the process illustrated in FIG. 13 may be performed by the server 200 in FIG. 2.

In step 1305, the image processing unit defines the top region and bottom region of the equirectangular mapped image or each of the equirectangular mapped frames of a video. The top region and bottom region can be predefined or based on a function such as amount of information in a region.

In step 1310, the image processing unit selects a row and determines if the row is in the top region or the bottom region. In step 1315, the image processing unit performs a smoothing process on the row of pixels when the row is in the top region or the bottom region. In step 1320, the image processing unit determines if there are any remaining rows in equirectangular mapped image or each of the equirectangular mapped frames of the video.

Figure 14:
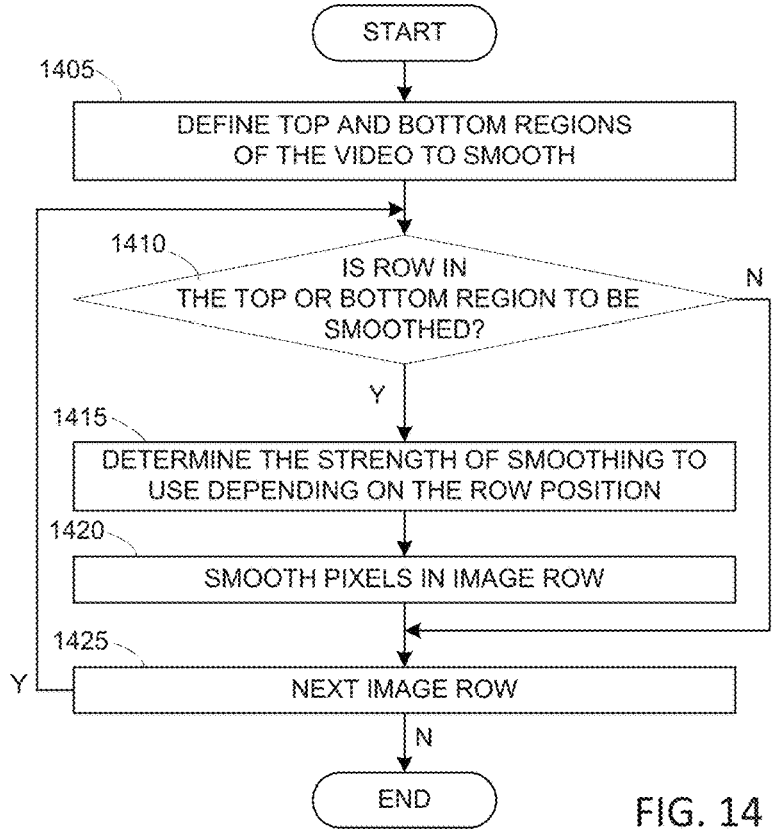
FIG. 14 illustrates a process for coding of 360 degrees videos using row position for a strength of the region adaptive smoothing according to various embodiments of the present disclosure.

FIG. 14 illustrates a process for coding of 360 degrees videos using row position for a strength of the region adaptive smoothing according to various embodiments of the present disclosure. For example, the process illustrated in FIG. 14 may be performed by the server 200 in FIG. 2.

In step 1405, the image processing unit defines the top region and bottom region of the equirectangular mapped image or each of the equirectangular mapped frames of a video. The top region and bottom region can be predefined or based on a function such as amount of information in a region. In step 1410, the image processing unit selects a row and determines if the row is in the top region or the bottom region.

In step 1415, the image processing unit determines the strength of smoothing to use depending on the row position. The rows at the top and bottom of the equirectangular mapped image have the same amount of pixels as the other rows in the map, but represent a much smaller amount of pixels on the sphere. Therefore, when the sphere is rendered, the north and south poles include more information than was actually captured. Because of this effect of equirectangular mapping, the strength of the smoothing increases as the rows approach the top and bottom of the equirectangular mapped image. The strength of the smoothing can be determined based on a ratio between the amount of pixels in the row and the amount of pixels in the corresponding portion or line of latitude of the virtual sphere.

In step 1420, the image processing unit performs a smoothing process on the row of pixels when the row is in the top region or the bottom region. In step 1420, the image processing unit determines if there are any remaining rows in equirectangular mapped image or each of the equirectangular mapped frames of the video.

Figure 15:
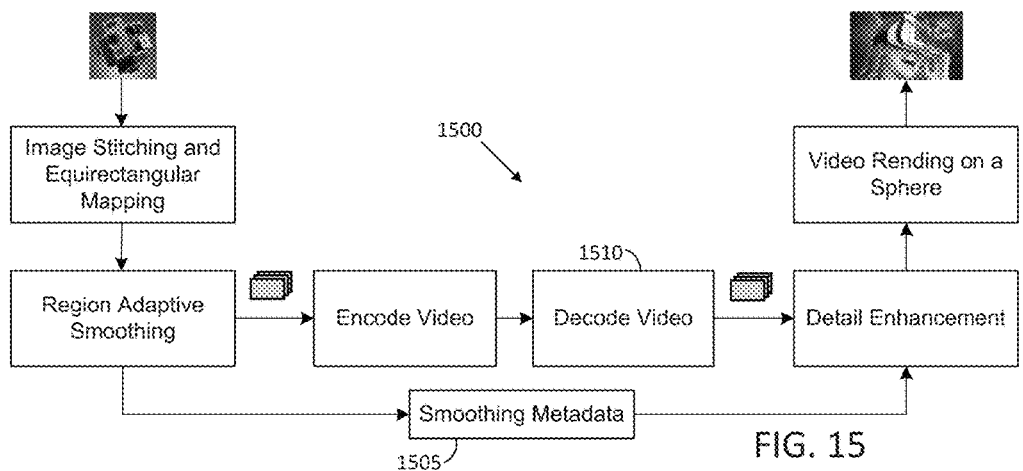
FIG. 15 illustrates a 360 degrees video processing chain according to various embodiments of the present disclosure.

FIG. 15 illustrates a 360 degrees video processing chain according to various embodiments of the present disclosure. In addition to the process in FIG. 11, the encoder transmits smoothing metadata 1505 to the decoder for extra detail enhancement 1510. The smoothing metadata comprises smoothed region information including bounding box coordinates and smoothed filtering information including a filtering type, a filtering strength, and whether fixed or variable smoothing was used. Transmitting the smoothing metadata allows for greater smoothing in the equirectangular mapped image. The detail enhancement includes methods such as edge enhancement and inverse filtering.

Figure 16A:
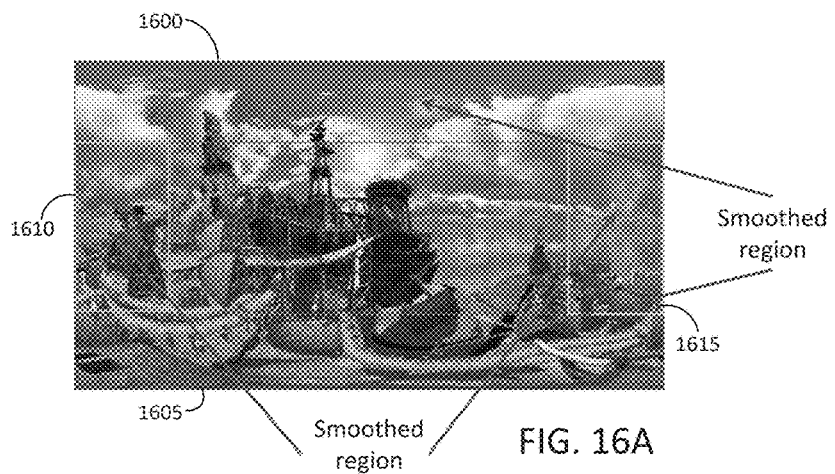
FIGS. 16A and 16B illustrate alternative smoothing regions according to various embodiments of the present disclosure.
Figure 16B:
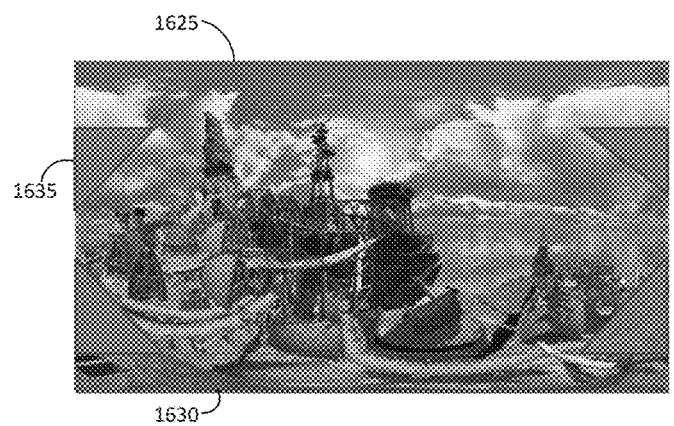

FIGS. 16A and 16B illustrate alternative smoothing regions according to various embodiments of the present disclosure. Along with smoothing a top region 1600 and a bottom region 1605, a left region 1610 and a right region 1615 can also be smoothed. The different regions can by asymmetrical, as in an asymmetrical top region 1625 and an asymmetrical bottom region 1630. In certain embodiments, the corners are smoothed at an angle. The purpose of the alternative smoothing regions is to increase the bitrate of the transfer, while minimizing the perceptual loss.

Figure 17:
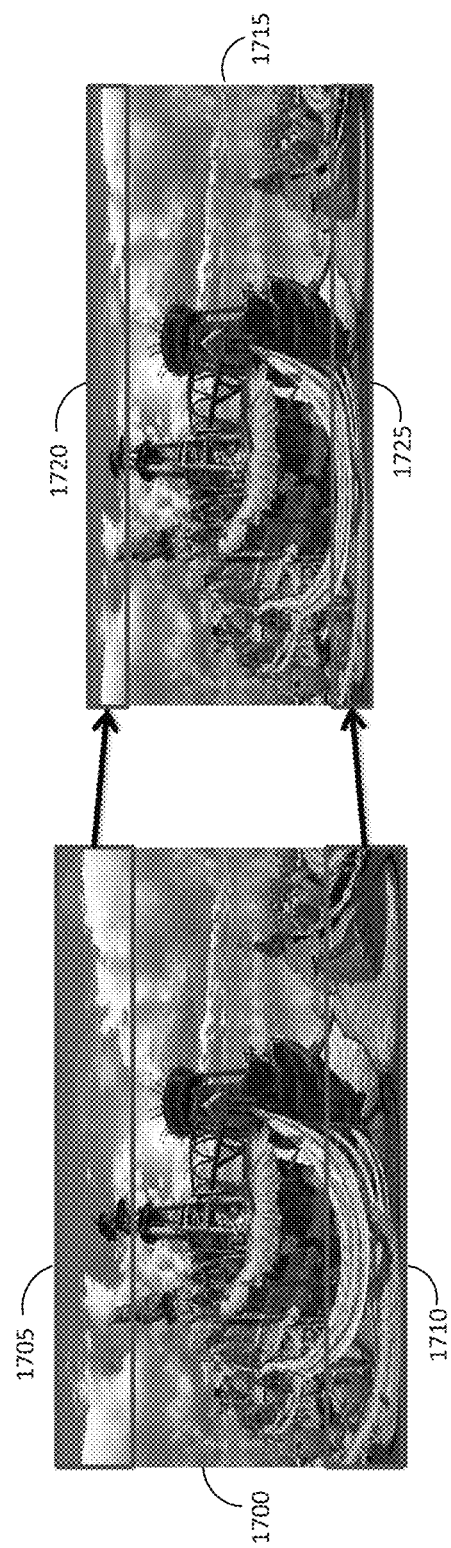
FIG. 17 illustrates squeezing the top region and bottom region of an equirectangular mapped frame according to various embodiments of the present disclosure.

FIG. 17 illustrates squeezing the top region 1705 and bottom region 1710 of an equirectangular mapped frame 1700 according to various embodiments of the present disclosure.

Because the top region 1705 and bottom region 1710 of the equirectangular mapped frame contain a higher resolution than what is perceptually noticeable, these regions can be squeezed before encoding to reduce the amount of transform coefficients to be transmitted resulting in bitrate savings. The squeezed top region 1720 and squeezed bottom region 1725 of the squeezed equirectangular mapped frame 1715 do not lead to perceptual quality degradation when viewed. The squeezing can be uniform across the top region 1705 or the bottom region 1710. For example, the downsampling ration of the top twenty percent of the image can be uniform as 2. The squeezing can also be adaptive depending on the resolution of the top region 1705 or bottom region 1710. For example, if the top ten percent of the equirectangular frame contains a lower resolution that the ten to twenty percent of the equirectangular frame 1700, the top ten percent could have a down-sampling ratio of 4 while the higher resolution portion of the top region 1705 could have a down-sampling ratio of 2.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An image processing unit comprising:
a memory; and
one or more processors operably connected to the memory, the one or more processors configured to:
stitch together a plurality of video frames into a plurality of equirectangular mapped frames of a video;
define a top region and a bottom region as a function of an amount of information in a region for each of the equirectangular mapped frames of the video;
perform a smoothing process on the top region and the bottom region for each of the equirectangular mapped frames of the video, wherein a strength of the smoothing process is determined based on a ratio between an amount of pixels in a row and an amount of pixels in a corresponding portion of a virtual sphere; and encode the smoothed equirectangular mapped frames of the video.

2. The image processing unit of claim 1, wherein an increase in a ratio of an amount of pixels across a row in the top region or the bottom region compared to an amount of pixels of a corresponding portion of the virtual sphere increases a filter strength of the smoothing process for the row in the top region or the bottom region.

3. The image processing unit of claim 1, wherein to perform the smoothing process on the top region and the bottom region, the one or more processors are further configured to vary quantization parameters for encoding.

4. The image processing unit of claim 1, wherein the smoothing process comprises using a Gaussian filter to smooth the top region and the bottom region, wherein the Gaussian filter is calculated as a function of:

$$\sigma^2 = K - \frac{K}{\sqrt{1-y^2}}.$$

5. The image processing unit of claim 1, wherein the one or more processors are further configured to perform the smoothing process on a left region and a right region for each of the equirectangular mapped frames of the video.

6. The image processing unit of claim 1, wherein the one or more processors are further configured to perform the smoothing process on a plurality of corner regions for each of the equirectangular mapped frames of the video.

7. The image processing unit of claim 1, wherein the top region and the bottom region are asymmetrical.

8. The image processing unit of claim 1, further comprising a transceiver configured to transmit metadata comprising smoothed region information including bounding box coordinates and smoothed filtering information including a filtering type, a filtering strength, and whether fixed or variable smoothing was used.

9. The image processing unit of claim 1, wherein the one or more processors are further configured to perform a squeezing process on the top region and the bottom region for each of the equirectangular mapped frames of the video.

10. An image processing unit comprising:
a receiver configured to receive metadata for smoothed equirectangular mapped frames of a video; and
one or more processors configured to:
decode the smoothed equirectangular mapped frames of the video smoothed across smoothed regions along an outside border of the smoothed equirectangular mapped frames of a video;
perform an enhancement technique on the smoothed regions based on the received metadata that indicates a smoothing strength that is determined based on a ratio between an amount of pixels in a row and an amount of pixels in a corresponding portion of a virtual sphere; and
render each of the smoothed equirectangular mapped frames of the video into a spherical shape.

11. The image processing unit of claim 10, wherein the enhancement technique comprises at least one of edge enhancement or inverse filtering.

12. The image processing unit of claim 10, wherein the metadata comprises smoothed region information including bounding box coordinates and smoothed filtering information including a filtering type, a filtering strength, and whether fixed or variable smoothing was used.

13. The image processing unit of claim 12, wherein the one or more processors are further configured to identify the smoothed regions for each of the smoothed equirectangular mapped frames of a video based on the smooth region information.

14. The image processing unit of claim 12, wherein the one or more processors are further configured to identify smoothing techniques for each of the smoothed equirectangular mapped frames of a video based on the smoothed filtering information.

15. The image processing unit of claim 12, wherein the one or more processors are further configured to identify variable smoothing using a Gaussian filter, wherein the Gaussian filter is calculated as a function of:

$$\sigma^2 = K - \frac{K}{\sqrt{1-y^2}}.$$

16. A method for region adaptive smoothing, the method comprising:
stitching a plurality of video frames into equirectangular mapped frames of a video, respectively;
defining a top region and a bottom region as function of an amount of information in a region for each of the equirectangular mapped frames of the video;
performing a smoothing process on the top region and the bottom region for each of the equirectangular mapped frames of the video, wherein a strength of the smoothing process is determined based on a ratio between an amount of pixels in a row and an amount of pixels in a corresponding portion of a virtual sphere; and
encoding the smoothed equirectangular mapped frames of the video.

17. The method of claim 16, wherein an increase in a ratio of an amount of pixels across a row in the top region or the bottom region compared to an amount of pixels of a corresponding portion of the virtual sphere increases a filter strength of the smoothing process for the row in the top region or the bottom region.

18. The method of claim 16, wherein performing the smoothing process on the top region and the bottom region comprises varying quantization parameters for encoding.

19. The method of claim 16, wherein the smoothing process comprises using a Gaussian filter to smooth the top region and the bottom region, wherein the Gaussian filter is calculated as a function of:

$$\sigma^2 = K - \frac{K}{\sqrt{1-y^2}}.$$

20. The method of claim 16, further comprising performing the smoothing process on a left region and a right region for each of the equirectangular mapped frames of the video.

* * * * *